United States Patent
Hücker et al.

(10) Patent No.: US 7,213,846 B2
(45) Date of Patent: May 8, 2007

(54) HYDRAULIC CONNECTOR BLOCK FOR AXIALLY SHIFTABLE PART

(75) Inventors: Rolf Hücker, Kreuztal (DE); Karl Keller, Hilchenbach (DE)

(73) Assignee: SMS Demag Aktiengesellschaft, Dusseldorf (DE)

( * ) Notice: Subject to any disclaimer, the term of this patent is extended or adjusted under 35 U.S.C. 154(b) by 0 days.

(21) Appl. No.: 10/496,221

(22) PCT Filed: Nov. 9, 2002

(86) PCT No.: PCT/EP02/12539

§ 371 (c)(1),
(2), (4) Date: May 18, 2004

(87) PCT Pub. No.: WO03/044415

PCT Pub. Date: May 30, 2003

(65) Prior Publication Data

US 2004/0262915 A1 Dec. 30, 2004

(30) Foreign Application Priority Data

Nov. 23, 2001 (DE) .............................. 101 57 318
Aug. 29, 2002 (DE) .............................. 102 39 615

(51) Int. Cl.
*F16L 27/00* (2006.01)
(52) U.S. Cl. .............................. 285/121.5; 285/121.3; 285/121.6

(58) Field of Classification Search ............. 285/121.2, 285/121.3, 190, 121.6, 272, 98, 273, 275, 285/127.1, 121.5
See application file for complete search history.

(56) References Cited

U.S. PATENT DOCUMENTS 2,872,217 A * 2/1959 May .............................. 285/98

(Continued)

FOREIGN PATENT DOCUMENTS

DE 33 19 618 12/1984

(Continued)

*Primary Examiner*—Aaron Dunwoody
(74) *Attorney, Agent, or Firm*—Andrew Wilford

(57) ABSTRACT

A bearing has a mount relative to which can move a part to which hydraulic fluid must be supplied. A connector has a housing fixed to the bearing mount and formed with a central bore centered on an axis and with a radial bore extending outward from the central bore. A tube axially shiftable in the central bore forms at the radial bore an annular compartment and has a passage opening radially into the compartment and axially at one end of the tube. A conduit is connected a coupling at one end of the tube and the part. Another coupling at an outer end of the radial bore connects to a source of hydraulic fluid under pressure so that the fluid can flow through the radial bore, annular compartment, and passage to the coupling at the one end of the tube and then through the conduit to the movable bearing part.

5 Claims, 1 Drawing Sheet

U.S. PATENT DOCUMENTS

| | | | |
|---|---|---|---|
| 3,442,539 A * | 5/1969 | Randall | 285/190 |
| 4,726,397 A * | 2/1988 | Stich | 137/580 |
| 4,790,699 A * | 12/1988 | Ringel | 409/231 |
| 5,065,792 A * | 11/1991 | Ohta et al. | 137/580 |
| 5,156,422 A * | 10/1992 | Shibano | 285/123.1 |
| 5,188,146 A * | 2/1993 | Cook et al. | 137/580 |
| 5,284,348 A * | 2/1994 | Tanaka et al. | 279/43.7 |
| 5,439,029 A * | 8/1995 | Becker | 137/580 |
| 6,038,948 A * | 3/2000 | Link et al. | 82/147 |
| 6,085,782 A * | 7/2000 | Ott | 137/580 |
| 6,308,734 B1 * | 10/2001 | Smith et al. | 137/580 |
| 6,602,031 B2 * | 8/2003 | Hara | 409/131 |

FOREIGN PATENT DOCUMENTS

| | | |
|---|---|---|
| DE | 37 25 222 | 2/1989 |
| EP | 0 955 123 | 11/1999 |

* cited by examiner

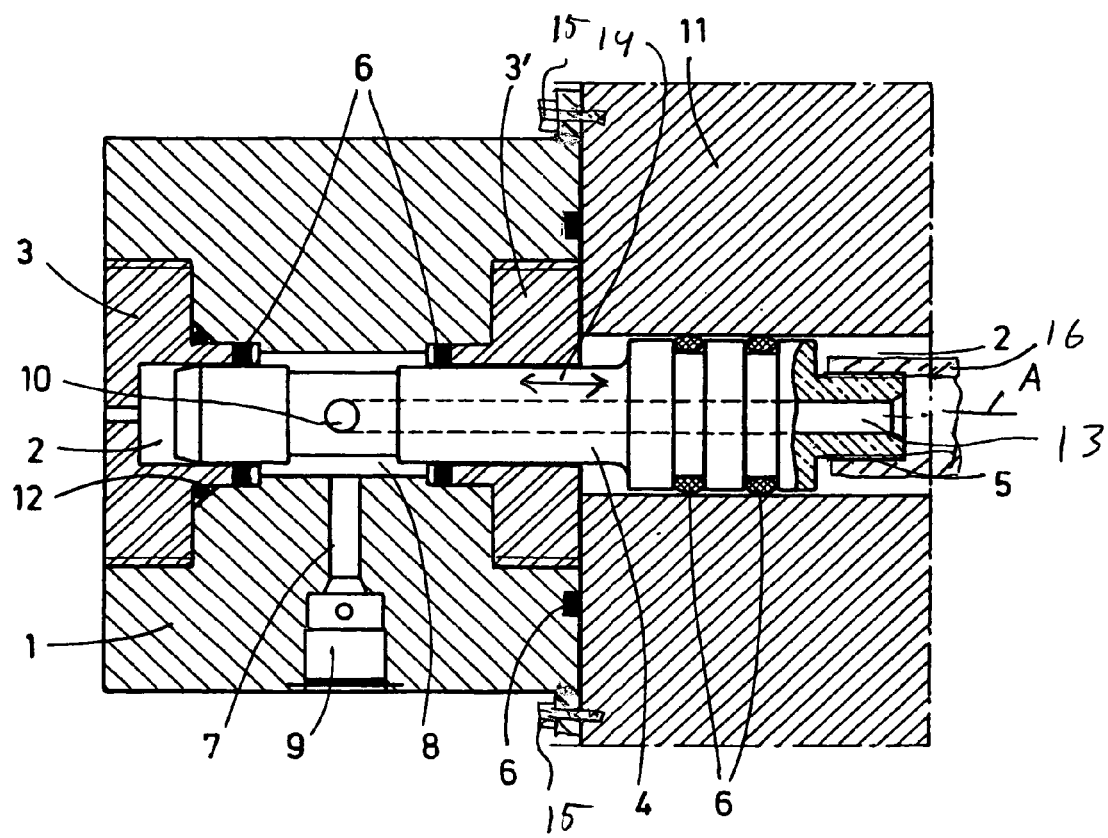

HYDRAULIC CONNECTOR BLOCK FOR AXIALLY SHIFTABLE PART

CROSS REFERENCE TO RELATED APPLICATIONS

This application is the US national phase of PCT application PCT/EP02/12539, filed 9 Nov. 2002, published 30 May 2003 as WO 03/044415, and claiming the priority of German patent application 10157318.9 itself filed 23 Nov. 2001 and German patent application 10239615.9 itself filed 29 Aug. 2002.

FIELD OF THE INVENTION

The invention relates to a connector block for a hydraulic supply line of a hydrostatic unit of an oil-film bearing that is fixed to a bearing mount and that has at least one hydraulic hose that is connected with a journal bushing movable in the bearing mount.

BACKGROUND OF THE INVENTION

Such a connector block has a quick-connect coupling by means of which, for example when a roll is to be changed, it is possible to make the fastest possible connection of the bearing to an oil supply. The connector block further has a hydraulic hose that serves to feed the hydraulic fluid to the bearing sleeve. The bearing sleeve is movable in the mount so that the hydraulic hose can compensate for the movement between the bearing sleeve and the stationary connector block. The hose is thus exposed at the bearing mount.

As a result there is the danger of damage to the hoses on the one side by friction against the bearing mount and above all by unintentional damage taking place in the mill during roll change, all leading to rupture of the hoses.

OBJECT OF THE INVENTION

It is an object of the invention to improve on a connector block such that these disadvantages are avoided and that the service safety of the hydrostatic unit is increased.

SUMMARY OF THE INVENTION

This object is achieved in that the connector block has a bore provided with bushings in which a connector tube is axially slidable. The connector block also has at least one bore extending radially of the central bore and having an outer end provided with a connector for a quick-connect coupling of a connector hose, the radial bore opening oppositely into an annular compartment surrounding the connector tube. The connector tube has at the annular compartment at least one radially extending passage. One end of the connector tube is closed and the other end is provided with a coupling for a connector hose extending to the bearing sleeve. The connector tube that can shift axially in the connector block can compensate for movements of the bearing sleeve. In this manner the connector block can be connected via a conduit, e.g. a very robust hose or even a rigid pipe, with the bearing sleeve.

BRIEF DESCRIPTION OF THE DRAWING

The invention is more closely described with reference to a drawing having a sole FIGURE.

SPECIFIC DESCRIPTION

The drawing shows a connector block 1 that has a central bore 2 centered on an axis A. Bushings 3 and 3' are provided in the central bore 2 which also holds a connector tube 4 having a central axially extending passage 13. The passage 13 of the connector tube 4 is closed at one end and the tube 4 has an axially opposite open end provided with a connector 5 for a conduit 16, for instance a pipe or hose. In this manner the connector 5 as well as a hose coupling joined to the connector 5 on the tube 4 is protected inside a bearing mount 11.

The connector tube 4 is sealed in the central bore 2 or relative to the bushings 3 and 3' by seals 6. The connector block 1 is formed with a radial bore 7 ending in an annular compartment 8 surrounding the tube 4. An outer end of the radial bore 7 has a quick-connect coupling 9. The connector tube 4 has at least one radial passage 10 that connects the annular compartment 8 with the passage 13 of the connector tube 4.

Hydraulic fluid can flow via the quick-connect coupling 9, radial bore 7, annular compartment 8, radial passage 10, and passage 13 to the coupling 5 of the connector tube 4. Movement of the unillustrated bearing sleeve is transmitted via the unillustrated tube or pipe to the connector tube 4 which can compensate for this movement by shifting axially in the stationary connector block 1 as shown by arrow 14.

The connector block 1 is secured by bolts 15 to the bearing mount 11 so that it is not sensitive to shocks. Another seal 12 protects the interior of the hydraulic circuit and the bearing mount 11 from coolant and dirt. The connector block 1 can be made of corrosion-resistant material so that it will not be damaged by coolant.

The invention claimed is:

1. A bearing/connector assembly comprising:
    a bearing mount;
    a generally stationary housing bolted to the bearing mount and formed with a central bore centered on an axis and with a radial bore extending outward from the central bore;
    a tube in the central bore, forming at the radial bore an annular compartment, and having a passage opening radially into the compartment and axially at one end of the tube;
    structure in the housing supporting the tube for axial movement in the bore;
    a coupling at the one end of the tube;
    a conduit between the coupling and a part to which hydraulic fluid must be supplied; and
    another coupling at an outer end of the radial bore for connection to a source of hydraulic fluid under pressure, whereby the fluid can flow through the radial bore, annular compartment, and passage to the coupling at the one end of the tube and thence through the conduit to the part.

2. The connector defined in claim 1 wherein the structure includes bushings slidably supporting the tube.

3. The connector defined in claim 2, further comprising seals flanking the compartment between the housing and the tube.

4. The connector defined in claim 1 wherein the coupling at the one end of the tube is received in the central bore and recessed in the housing.

5. The connector defined in claim 1 wherein the central bore is throughgoing and has an end opposite the one end of the tube, the connector further comprising
    means for sealing the opposite end relative to the tube.

* * * * *